United States Patent [19]

Sabatini et al.

[11] Patent Number: 4,896,159
[45] Date of Patent: Jan. 23, 1990

[54] RADAR SYSTEM WITH PULSE-TO-PULSE FREQUENCY AGILITY AND MULTIPLE-TIME-AROUND ECHO RESOLUTION

[75] Inventors: Sergio Sabatini, Rome; Artenio Russo, Tora E Piccilli; Giuseppe Rodriguez, Rome; Giancarlo Camertoni, Rome; Piero Pratesi, Rome, all of Italy

[73] Assignee: Selenia, Industrie Elettroniche Associate, S.P.A., Rome, Italy

[21] Appl. No.: 198,427

[22] Filed: May 25, 1988

[30] Foreign Application Priority Data

May 26, 1987 [IT] Italy ................................ 47986 A/87

[51] Int. Cl.$^4$ .............................................. G01S 13/08
[52] U.S. Cl. ...................................... 342/131; 342/149
[58] Field of Search ............................ 342/131, 85, 149

[56] References Cited

U.S. PATENT DOCUMENTS

| | | | |
|---|---|---|---|
| 2,817,832 | 12/1957 | Mathes | 342/131 |
| 3,383,686 | 5/1968 | Davis et al. | 392/131 |
| 4,155,088 | 5/1979 | Taylor, Jr. et al. | 392/131 |
| 4,375,641 | 3/1983 | Josefsson et al. | 342/131 |
| 4,688,043 | 8/1987 | Welsh | 342/131 |

Primary Examiner—Thomas H. Tarcza
Assistant Examiner—Mark Hellner
Attorney, Agent, or Firm—Herbert Dubno

[57] ABSTRACT

Device for radar utilized to detect multiple-time-around echoes with the capability of transmitting in frequency agility and, besides the advantages due to this type of technique, further, capable of reading the ambiguity of distance directly by separating in frequency the multiple-time-around echoes. The device described is applicable to any pulses radar, such as for example, search or tracking, in which it is necessary to detect targets and recognize multiple-time-around echoes. Nevertheless its application is especially suited to a multifunctional radar (with phased-array antenna and monopulse capability).

10 Claims, 8 Drawing Sheets

RADAR SYSTEM WITH PULSE-TO-PULSE FREQUENCY AGILITY AND MULTIPLE-TIME-AROUND ECHO RESOLUTION

FIELD OF THE INVENTION

Our present invention relates to a radar system with pulse-to-pulse frequency agility capable of being used for the detection and recognition of multiple-time-around echoes and, preferably, a monopulse or phased-array radar system which can be provided with pulse-to-pulse frequency agility and multiple-time-around echo resolution.

BACKGROUND OF THE INVENTION

In radar applications where it may be convenient to use a fairly high value of the pulse repetition frequency (PRF), the resulting nonambiguous range may be shorter than is required by the radar system. If this occurs, it may not be possible to transmit in frequency agility from pulse-to-pulse because of loss of the multiple-time-around echoes.

OBJECTS OF THE INVENTION

It is the principal object of the present invention to provide an apparatus forming part of a radar system which can operate in a pulse-to-pulse frequency agility mode and yet can resolve and thereby utilize multiple-time-around echoes.

More specifically, it is an object of this invention to provide a device which enables transmission in frequency agility from pulse-to-pulse without losing multiple-time-around echoes and, moreover, which allows an immediate resolution of range ambiguity based on use of the multiple-time-around echoes.

Another object of this invention is to provide an improved method of operating a radar system so that it can operate, at least in one mode, with pulse-to-pulse frequency agility and without loss of multiple-time-around echoes, especially for the purpose of resolving range ambiguity in such a system.

It is also an object of this invention to provide a radar target-acquisition method and apparatus which can be of the monopulse type in one mode but of a pulse-to-pulse frequency-agility type in another mode without inordinately increasing the cost of the system.

SUMMARY OF THE INVENTION

These objects and others which will become apparent hereinafter are attained, in accordance with the present invention, in a radar with pulse-to-pulse frequency agility which has several receiving channels, each tuned to a frequency selected as a function of the sequence of the transmitted frequencies.

In one embodiment of the invention, a divider is provided at the output of the RF amplifier which distributes the RF signal which is received to the several channels. Alternatively or in addition, the oscillator can be an RF oscillator group from the output of which several frequencies can be tapped simultaneously and independently.

In another embodiment, the oscillator can have a STALO selection circuit which allows the selection of the frequencies which are available at the output of the STALO and this selection circuit is provided with a memory for the frequencies of several pulses previously transmitted by the radar.

Advantageously and in a best-mode embodiment of the invention, the pulse-to-pulse frequency-agility mode is applied in a conventional radar system, e.g. of the monopulse or phased-array type and the receivers of the several channels associated with the pulse-to-pulse frequency-agility mode, include the receivers normally present in the monopulse radar. In this case, a divider is provided at the output of the RF amplifier of the summation or $\Sigma$ channel which permits the RF signal to be distributed to, for example, three receiving channels including two auxiliary channels which in monopulse mode are considered to be difference or $\Delta$ channels.

The apparatus also can include a number of STALO distributors equal in number to the frequencies generated, with each distributor being capable of feeding a plurality of switches from which, after frequency multiplication, frequencies may be selected simultaneously and independently from among all of the frequencies available in the radar.

The transmission switch may be connected to the distributors for selection of the proper frequency to be fed to the transmitter. While the oscillator means may form a single unit, it is also possible in the present invention to form the oscillator group from several blocks which respectively feed the receiving channels without the use of the distributors.

The circuit may include a STALO selection circuit which controls the oscillator group and a receiving channel-selection circuit which controls the switches of these channels and the transmission switch. This selection circuit preferably includes a memory for the frequencies of the last two or more pulses which were transmitted.

In other words, the radar system of the invention can comprise:

oscillator means for generating a series of transmitted pulses of different frequencies with pulse-to-pulse frequency agility;

antenna means connected to the oscillator means for transmitting the transmitted pulses to a target and for receiving from the target on successive sweeps, first-time-around, second-time-around and multiple-time-around echoes during each of the sweeps;

a plurality of receiving channels connectable to the antenna means and each having a receiver tunable to one of the frequencies of the transmitted pulses; and means for tuning the receivers as a function of the sequence of the transmitted pulse frequencies.

In method terms, the invention comprises:

(a) transmitting to a target for searching or tracking a sequence of pulses and receiving from the target first-time-around, second-time-around and multiple-time-around echoes during each of a multiplicity of sweeps;

(b) changing the frequency of each transmitted pulse from sweep to sweep with pulse-to-pulse frequency agility, whereby the first-time-around echoes each have a frequency corresponding to that of the transmitted pulse of a respective sweep each second-time-around echo has a frequency corresponding to that of the transmitted pulse of an immediately prior sweep, and the multiple-time-around echoes each have a frequency corresponding to that of a transmitted pulse of a still-earlier sweep;

(c) tuning a plurality of receivers equal in number to the highest order multiple-time-around echo to be detected to respective frequencies equal to the transmitted pulse frequencies resulting in the first-time-around, the second-time-around and each of said multiple-timearound echoes up to the highest order multiple-time-around echo; and (d) detecting the echoes received from the target and channeling the echoes to the receivers whereby each receiver responds to echoes of a frequency to which that receiver has been tuned in step (c), thereby resolving the echoes and establishing a location of the target in a nonambiguous range of the radar system.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
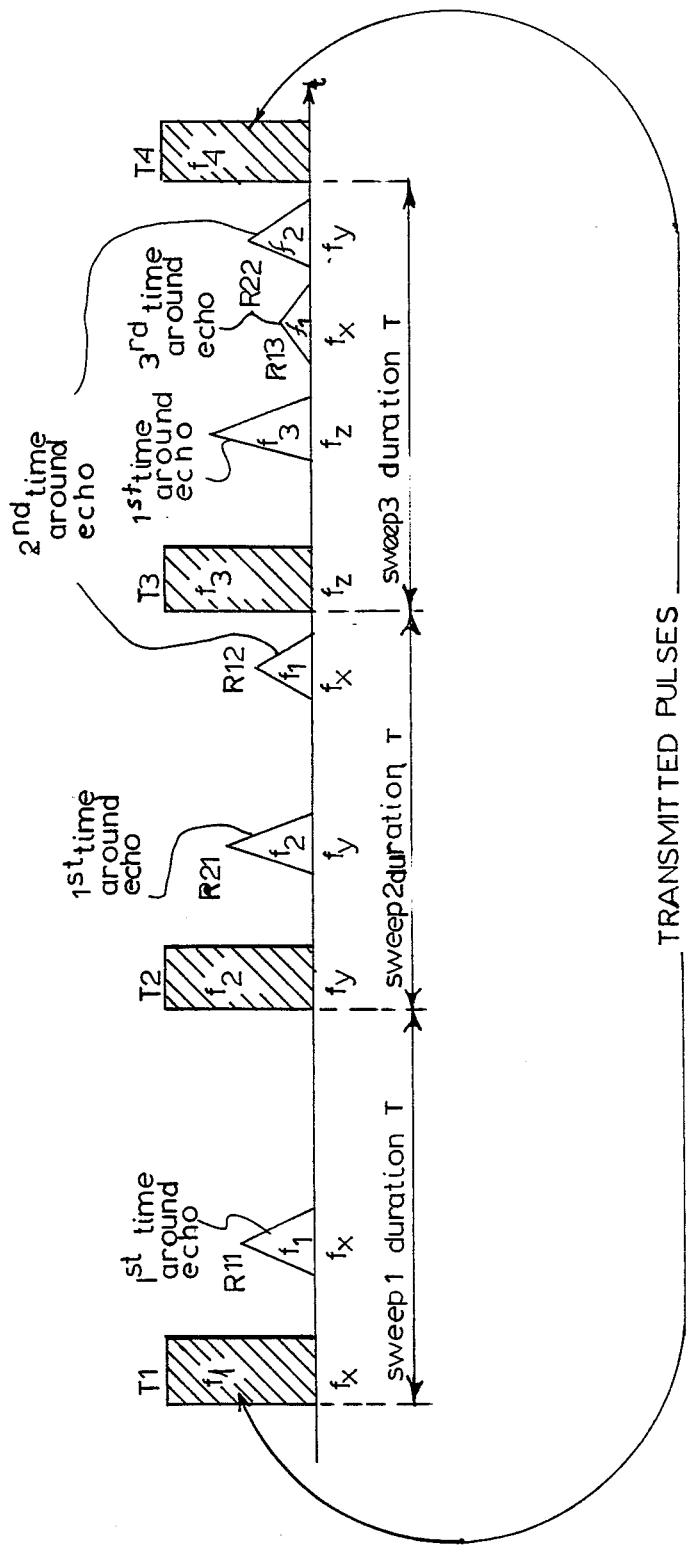
FIG. 1 is a pulse diagram showing several sweeps and the relationships of the echoes in these sweeps for the purposes of facilitating a description of the invention.

Below we shall describe two operational modes utilizing the principles of the invention in which we will refer to the diagram illustrated in FIG. 1 which should briefly be reviewed first.

Let us assume during a first sweep of the radar that a sweep duration T (FIG. 1) that a transmitted pulse $F_1$ of duration T1 and a frequency fx is transmitted and the echo $f_1$ is returned. This echo has the frequency fx and is given the index R11 to indicate that it is the first-time-around echo of the first pulse.

During the second sweep duration, another transmitted pulse $f_2$ is emitted by the radar and the first-time-around echo $f_2$ is obtained with the index R21 referring to the second pulse, first-time-around. During the sweep duration, the second-time-around echo of the first pulse R12 is likewise received.

In the third sweep duration, the transmitted pulse is shown at T3, the first-time-around echo at R31 and the second-time-around echo R22 of the second pulse and the third-time-around echo R13 of the first pulse are also seen.

The invention in principle can operate in either of two schemes as outlined below:

(a) First scheme: (scheme a)

Starting from the beginning of the frequency-agility mode of operation after the transmission of the first pulse at $F_x$, the corresponding STALO frequency $f_x$ is switched on channel 1. During the time from t=o to t=T (where T=sweep duration) the output of channel 1 is the useful one for targets detected at ranges within R=cT/2. After the transmission at Fy of the second pulse, during the time from t=T to T=2T, the corresponding STALO frequency fy is switched to channel 1 while $f_x$ is switched to channel 2 and therefore the output of channel 1 provides the detection of targets detected at ranges between R and 2R while the output of channel 1 provides the detection of targets within range R.

After the transmission at $F_z$ of the third pulse during the time from t=2T to t=3T, the corresponding STALO frequency $f_z$ is switched to channel 1, fy to channel 2 and fx to channel 3 and therefore channel 3 provides detection of targets at ranges between 2R and 3R, channel 2 provides the detection of targets between R and 2R and channel 1 the detection of targets within range R.

From then onward, this device has reached normal operation and is capable of discriminating the multiple-time-around echoes up to the third by separating them on the three channels.

More precisely, only first-time-around echoes are detected in receiver 1 (corresponding to targets within the nonambiguous range of the radar). In receiver 2 only the second-time-around echoes are detected (corresponding to targets situated within the nonambiguous range of the radar and up to twice that value). In receiver 3 only third-time-around echoes are detected.

(b) Second scheme: (scheme b)

After the transmission at $F_x$ of the first pulse, the corresponding STALO frequency $f_x$ is tuned on channel 1 where it is kept fixed for 3 consecutive sweeps.

After the transmission at $F_y$ of the second pulse, channel 2 is tuned on $f_y$ where it is kept for 3 consecutive sweeps. The same applies to channel 3 which is tuned to $F_z$ for 3 consecutive sweeps after the transmission at $F_z$ of the third pulse.

In this way, although the transmission frequency is changed at every sweep, a target can be detected on the same channel up to a range equal to 3R because the STALO frequency to which it is tuned is fixed for 3 P.R.T. (Pulse Repetition Times) while the transmission frequency continuously changes from sweep to sweep. The outputs of the 3 channels are fed to the signal processor where they are reordered in time before further processing. It is important to note that if the P.R.T. (Pulse Repetition Time) changes from sweep to sweep, then the maximum range that can be resolved in both schemes is the one corresponding to the sum of the maximum nonambiguous ranges relevant to each P.R.T.

Moreover, the only condition imposed to ensure the correct functioning is that the interval between two transmissions of the same frequency must not be less than the ambiguity number in distance that is to be resolved, or to the number of receiving channels. There is no other constraint affecting the frequency agility, which can be chosen a priori according to any law, deterministic, or random, or also by means of a device which reflects the least jammed frequency.

It is only necessary that the system memorize the last two frequencies transmitted so as to be able to correctly activate the STALO outputs by means of the selection commands. The STALO switching occurs during pulse transmission times when the three receivers are inactive.

In principle it is possible to resolve multiple-time-around echoes of any order provided that the necessary number of receiving channels is matched to that order.

Figure 2:
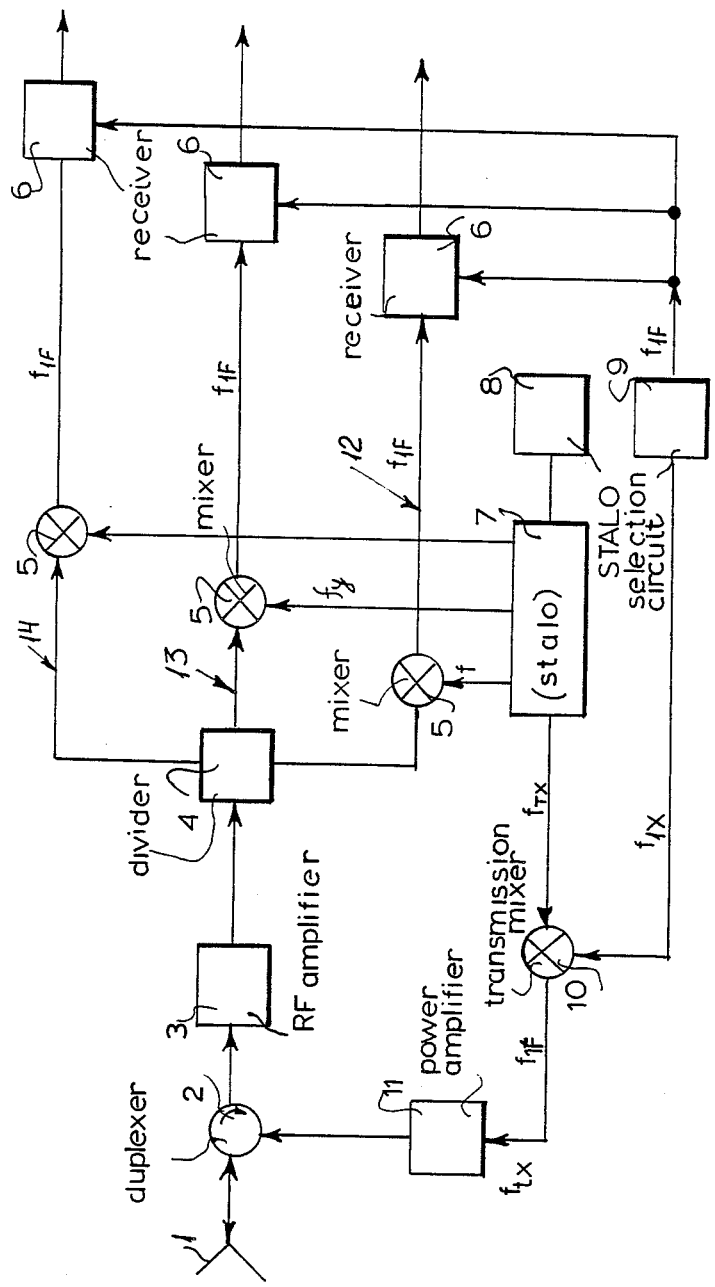
FIG. 2 is a block diagram of a radar circuit according to one embodiment of the invention.

FIG. 2 shows a radar system for practicing the method of the invention as described in connection with either of the two schemes. It should be noted, however, that this radar system is not capable of standard monopulse operation. In the best-mode embodiment (see FIGS. 3–8), the radar system also will be capable of monopulse operation.

FIG. 2 shows an antenna 1 which is connected to a duplexer 2 receiving its transmitting signal from the transmitter power amplifier 11 and delivering its received signal to the receiving RF amplifier 3. The output of the RF amplifier 3 is applied to a divider or distributor 4 capable of distributing a received signal to a plurality of receiver channels which we have indicated, for the sake of illustration, respectively, at 12, 13 and 14. Naturally, more than three receiver channels may be provided.

Each receiver channel includes a receiver 6 and the receivers for convenience have been designated as receivers: REC. 1, REC. 2 and REC. 3, respectively. The channels also include mixers 5.

The mixers receive respective frequency inputs from an RF oscillator group or STALO 7 which is provided with a STALO frequency selection circuit 8. A transmission frequency output from the STALO 7 is supplied to the mixer 10 which represents the transmission mixer, the latter also receiving an input from an IF oscillator 9 connected as well to the receivers 6. The outputs of the receivers are supplied to the display, recognition and evaluating circuitry of the radar and represent resolution of the various echoes, namely, the first-time-around echoes described with respect to the first and second schemes above in the first channel 12, the second-time-around echoes in the second channel 13 and the third-time-around echoes in the third channel 14.

The value of the radar for ranges which exceed that which is permissible in each sweep duration with only a first-time-around echo, is therefore greatly enhanced.

Figure 3:
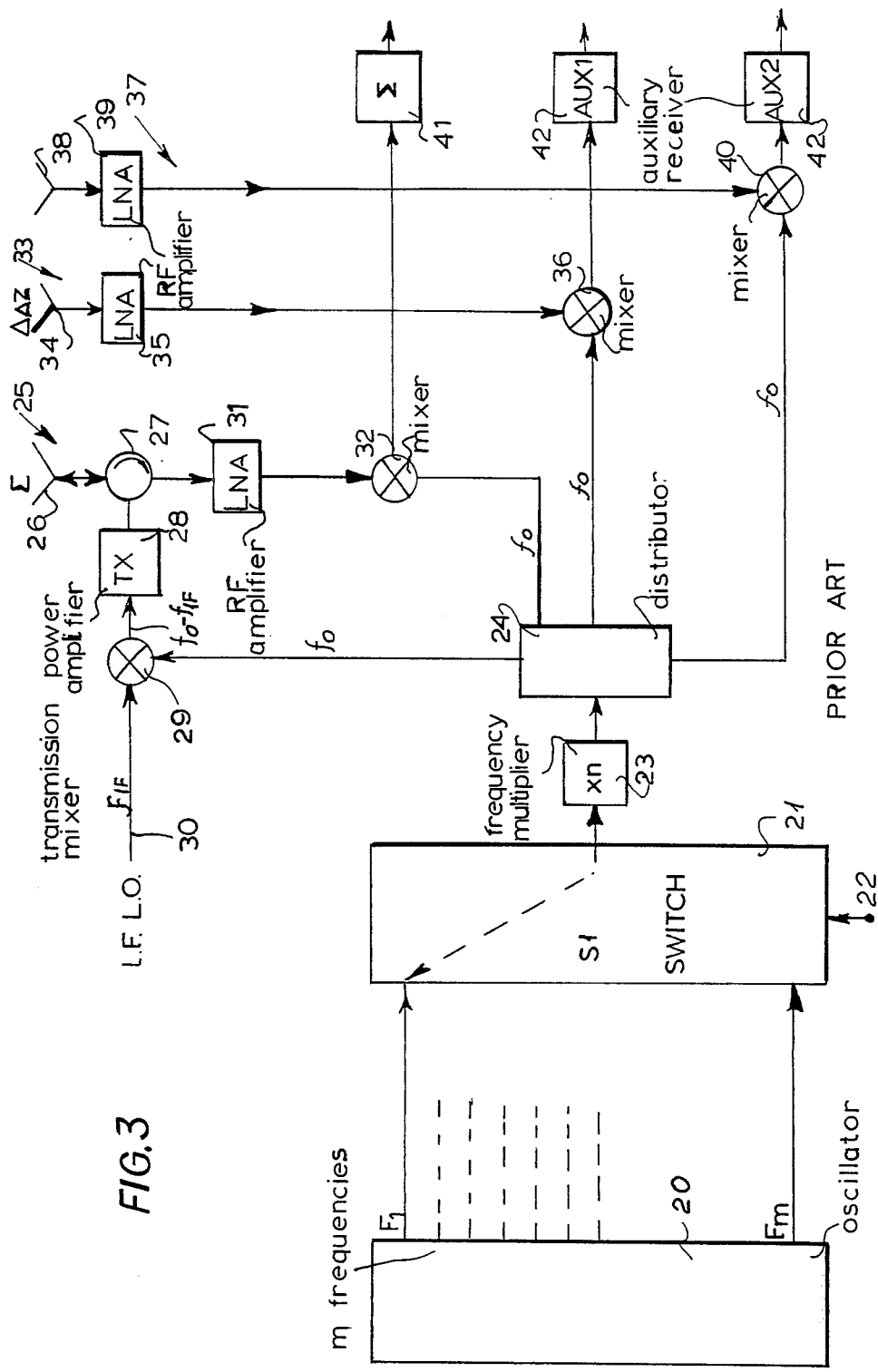
FIG. 3 is a block diagram illustrating the application of the invention to a radar using the monopulse mode and monopulse receivers and representing the prior art.

In FIG. 3 we have shown a prior art monopulse radar. In this circuit an oscillator group 20 can output a number of frequencies $F_1 \ldots F_m$ to a switch 21 also referred to as a switch S1 and which can receive a selection input 22.

The output from the switch 21 is applied to a frequency multiplier 23 which, in turn, is connected to a distributor 24 of the various signals to the several channels of the apparatus.

The apparatus also comprises a conventional summing or $\Sigma$ channel 25 with an antenna 26 and a duplexor 27. The latter receives a transmission pulse through a power amplifier 28 connected in turn to a transmission mixer 29 to which an IF signal is supplied at 30 and a signal $f_o$ is supplied from the distributor 24.

In the transmission aspect of the operation, and, of course, with respect to its receiving aspects in monopulse operation, this arrangement utilizes the principles described at chapter 21, pages 10–30 of Skolnik, Mich.: *Radar Handbook*, McGraw Hill Book Co., New York, 1970.

The summation channel 25 thus can have RF amplifier 31 connected to the duplexer 27 and feeding the mixer 32 which receives another input from the distributor 24. The output of the mixer is applied to the receiver channel 41 for the summation channel. The output of this unit, of course, may be applied to an amplitude detector, a video amplifier and range tracker as is known.

The system also includes an azimuth difference channel 33 with its antenna 34 and RF amplifier 35 feeding the mixer 36 which is connected to one of the auxiliary receivers 42, the latter, in turn, being connected to a phase-sensitive detector for azimuth angle error, as is well known.

The elevation difference channel 37 can have an antenna or antenna section 38 feeding the RF amplifier 39 and the mixer 40 which is connected to the auxiliary receiver 42, the latter being in turn connected to a phase-sensitive detector registering elevation angle error, if desired.

The circuit of FIG. 3 operates in the manner described in the above-mentioned publication to provide monopulse tracking and target detection.

Figure 4:
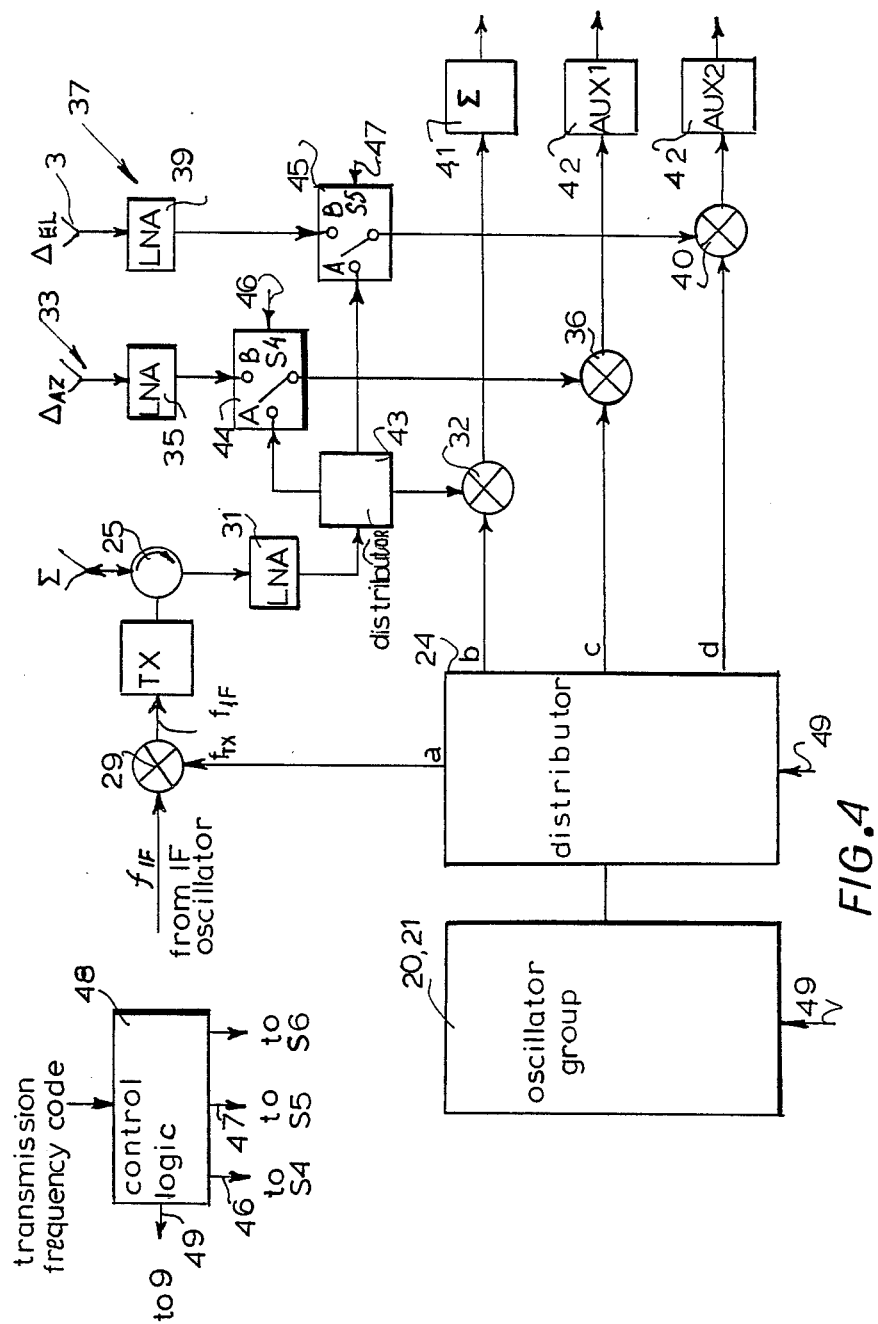
FIG. 4 is a block diagram illustrating application of the principles of the invention to the monopulse receiver system of FIG. 3.

That circuit is modified, in accordance with FIG. 4 in which elements corresponding to those of FIG. 3 are used and have been indicated with the same reference numerals.

In addition, however, the circuit includes a distributor 43 receiving an input from the RF amplifier 31 of the summation channel 25 and distributing outputs to the mixer 32 of the summation receiver 41 and to a pair of switches 54 and 55 also designated at 44 and 45 which are selector switches permitting selection between monopulse and pulse-to-pulse frequency-agility operations. The switches 44 and 45 receive inputs 46 and 47 from the control logic which here has been represented at 48, the control logic having a further output 49 to the oscillator group 20, 21 and/or the distributor 24.

The switches 44 and 45 thus have positions B in which the respective RF amplifiers 35 and 39 are connected to the mixers 36 and 40 and positions in which the mixers 36 and 40 forming second and third channels for pulse-to-pulse frequency-agility operation are connected to the distributor 43.

The invention thus provides a multifunctional radar with a phased-array antenna and monopulse channels for the measurement of the azimuth and elevation angles; the detection of the targets is performed on the receiver 41 connected to the $\Sigma$ channel while the $\Delta_{AZ}$ and $\Delta_{EL}$ receivers 42 are used for the measurement of the coordinate angles. The diagram showing the principle of such a radar is given in FIG. 3.

In this Figure the tuning of the three channels is the same; if multiple-time-around echoes have to be detected, the radar cannot use a waveform with frequency agility from pulse-to-pulse.

This limitation is overcome by the device of FIG. 4.

The operation of the devise is as follows. During the search function, in which monopulse measurement is not strictly required, switches S4 and S5 are set on A. Therefore the AUX 1, AUX2 recivers 42, receive only the signals from the $\Sigma$ beam. In frequency-agility operation, the frequency transmitted at every sweep is selected by the control logic according to the type of agility required (deterministic, pseudo-random, adaptive); the tuning of the receivers is performed according to one of the schemes a or b, already described.

Schemes a and b differ only in the implementation of elements 20, 21 and 24 in FIG. 4.

Figure 5:
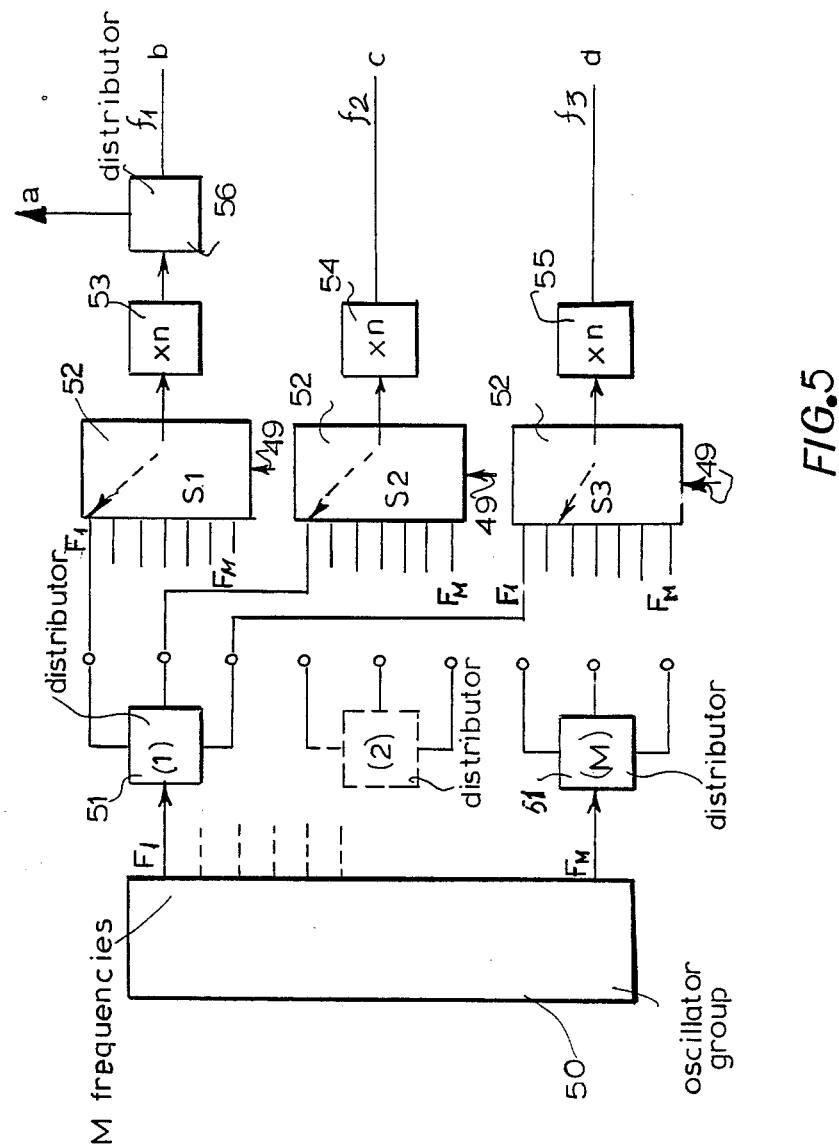
FIG. 5 is a block diagram illustrating a modification of the circuit of FIG. 4.

One implementation of the circuits 20, 21, 24 in FIG. 4 has been illustrated in FIG. 5 and is particularly applicable to scheme a as described above.

In FIG. 5, the oscillator, switch and distributor group 20, 21 and 24 of FIGS. 3 and 4 have been replaced by an oscillator group 50 having output frequencies $F_1 \ldots F_m$ connected to an equal number of group oscillator distributors 51, each of which has a number of outputs equal to the number of receiving channels utilized. In the present case, three such channels have been illustrated.

The group oscillator distributors 1 are connected to a corresponding number of switches 52 designated as switches S1, S2 and S3 for the respective channels, the switches having inputs from the control logic 48 as shown at 49.

The switches 52 output to respective frequency multipliers 53, 54, 55, respectively and a distributor 56 in the b channel provides an antenna output at a serving as the antenna output to the mixer 29 in FIG. 4.

Scheme a is thus effected utilizing the FIG. 5 modification of FIG. 4 as follows:

S1 controls the actual transmitted frequency while S2 and S3 tune AUX1 and AUX2 respectively on the two immediately preceding transmitted frequencies. In this way the first-time-around echoes will appear only in the Σ channel, the second-time-around echoes only in the AUX1 channel and the third-time-around echoes only in the AUX2 channel.

Figure 6:
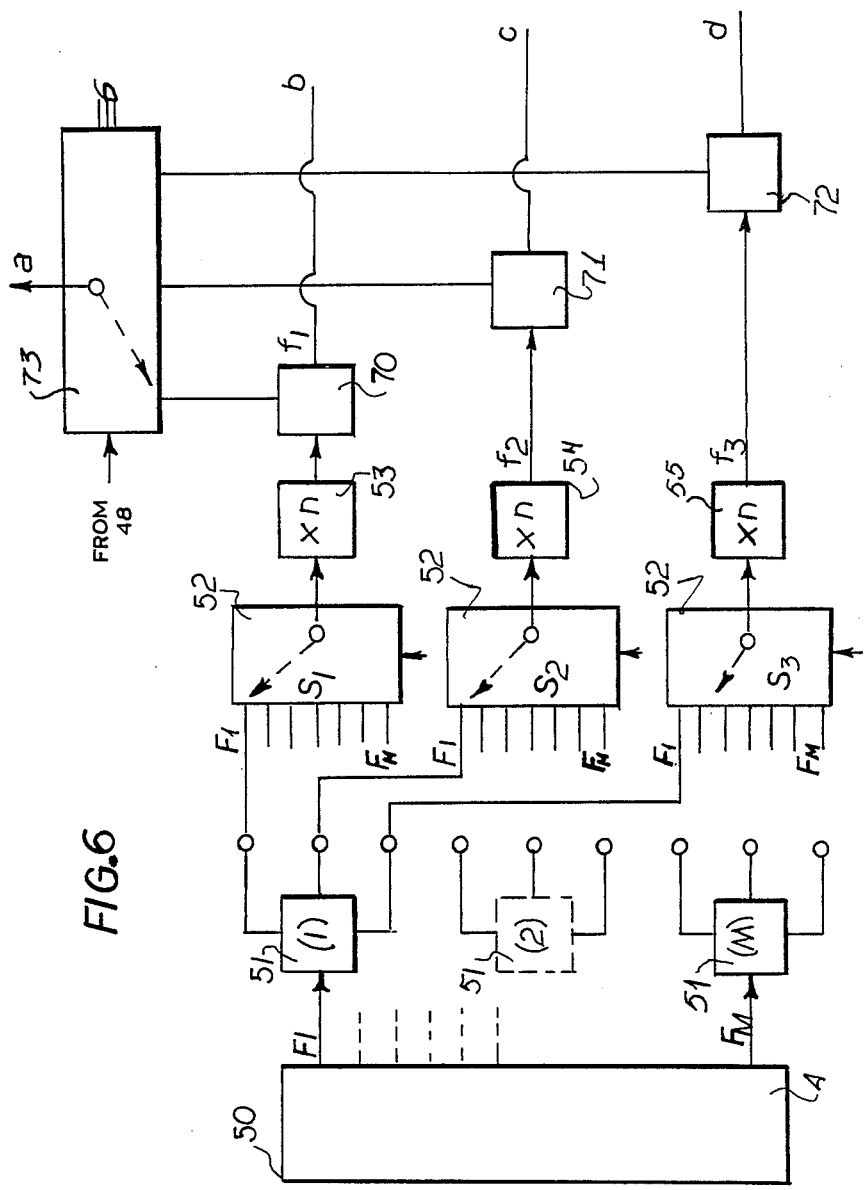
FIGS. 6–8 are block diagrams illustrating further modifications of the system of FIG. 4, particularly with respect to the oscillator groups or means.

The embodiment of the FIG. 6 variation of FIG. 4 is intended to carry out scheme b.

In this circuit, as in FIG. 5, the oscillator group 50 has $F_1 \ldots F_m$ frequency outputs feeding the m distributors 51, each of which has a number of outputs corresponding to the number of channels, in this case 3. Each of the distributors 51 is connected to one of the switches 52 and at the output side of each switch 52, a frequency multiplier 53, 54, 55 outputting signals to the respective channels b, c and d, in addition, each of these channels includes a distributor 70, 71, 72 providing an output to the switch 73 which is operated by the control logic 48 to allow selection of the transmitted pulse at a.

With reference to FIG. 6, and to the functional description of scheme b, the three distributors F0, F1 and F2 provide the frequency for the receiver mixers and through the S6 switch 73 the frequency for the transmission mixer, S6 is switched from pulse to pulse while the frequencies on which each channel is tuned are changed every three sweeps.

During the tracking function, in which the monopulse measurement is requested, the switches S4, S5 are set on B (see FIG. 4).

In this function the order of time-around echo of the target is known a priori, because it results from the search and/or from information stored in the track file.

In the frequency-agility mode, the frequency transmitted every sweep is selected as in search. If the target corresponds to a first-time-around echo, the three receivers are tuned to the same transmitted frequency.

If the target corresponds to a multiple-time-around echo, of order K>1, the three receivers shall be tuned to the frequency transmitted (K−1) sweeps before by the memory contained in the control logic.

Figure 7:
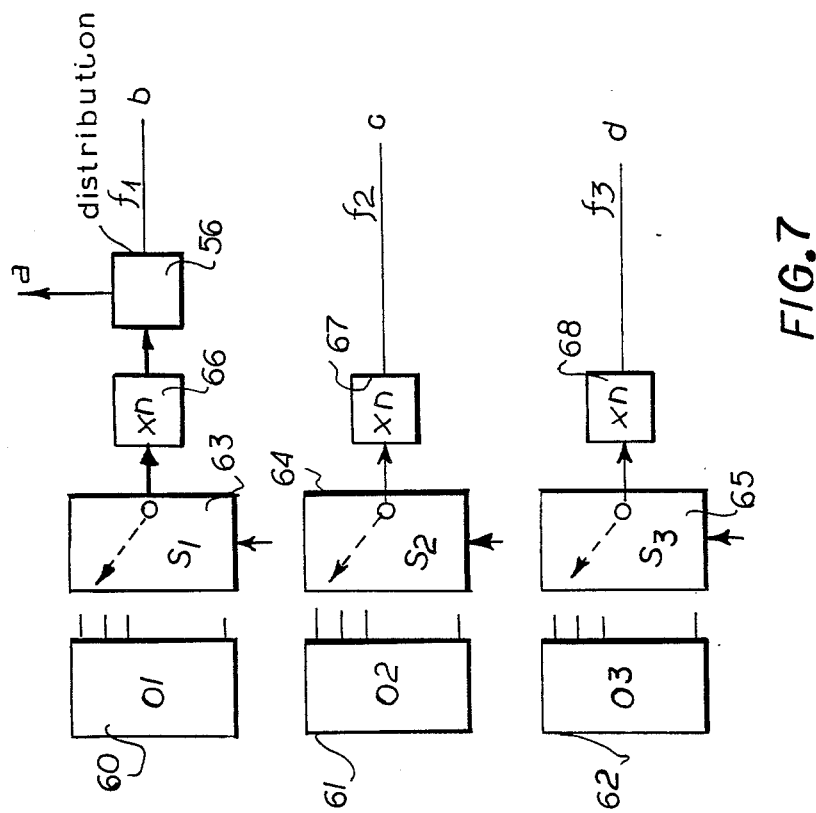
Figure 8:
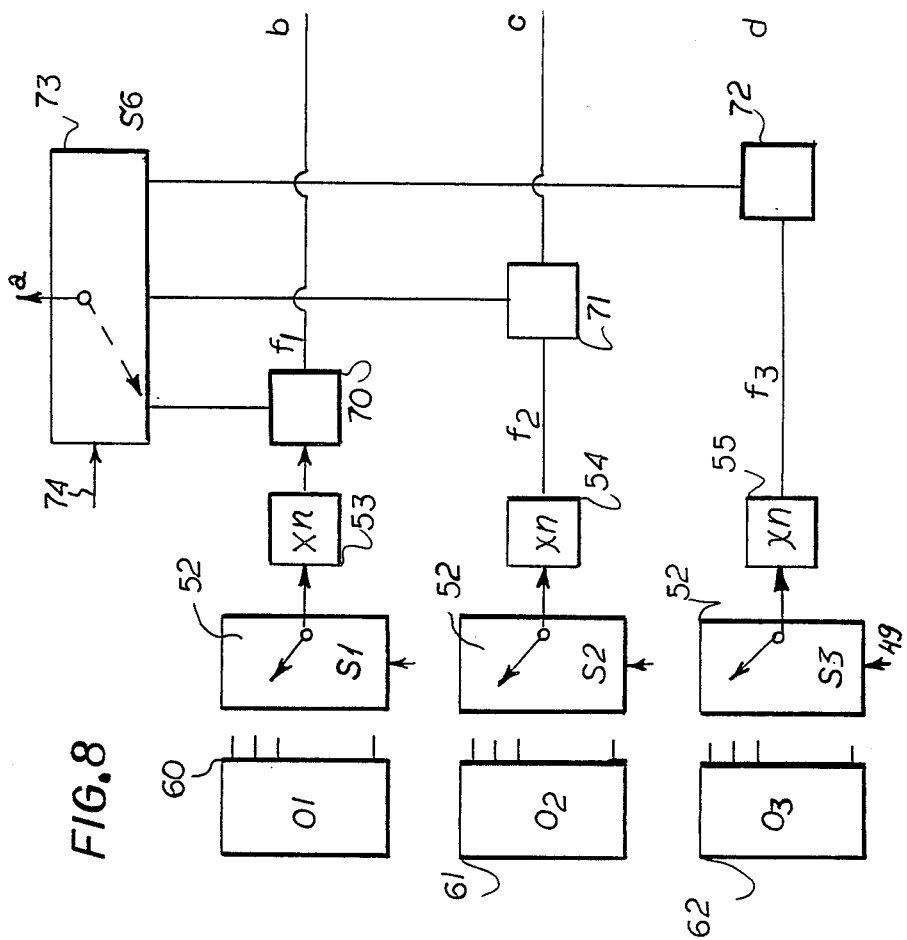

FIGS. 7 and 8 illustrate alternative oscillator group systems for those illustrated in FIGS. 5 and 6, respectively.

For example, in FIG. 7 (compare FIG. 5), the oscillator unit which is a single block 50 in FIG. 5 is subdivided into a number of oscillators 60, 61 and 62, for example, each outputting the frequencies $F_1 \ldots F_m$ to the respective switches 63–65 which correspond to the switches 51 of FIG. 5. The outputs of the switches feed frequency multipliers 66, 67 and 68 of the respective channels in a manner wholly analogous to the multipliers 53–55. A distributor 56 here serves the function of the same distributor in FIG. 5.

Similarly, in FIG. 8 (compare FIG. 6), the single oscillator block is replaced by oscillator units 60–62 which work directly into the switches 52 and have the frequency multipliers 53, 54 and 55 connected therewith.

As in the embodiment of FIG. 6, however, distributors 70, 71 and 72 are provided to supply outputs along the respective lines b, c and d and well as outputs to the switch S6 which has been represented at 73 and which is also operated by the controller 48 via an input 74.

Thus the embodiment of FIGS. 7 and 8 substitute for the single-frequency-generation group of FIGS. 5 and 6, followed by m dividers where m is equal to the number of frequencies generated, a number of frequency-generation groups 60–62 equal in the number to the number of channels and each capable of generating m frequencies. Otherwise the embodiments of FIGS. 7 and 8 operate in the manner described in connection with FIGS. 5 and 6 respectively.

Concluding, the device described allows the transmission of a pulse-to-pulse frequency agility to be used even if multiple-time-around targets are to be detected.

The device allows the automatic recognition of the order of time-around echoes by a separation into several parallel receiving channels. It can be used both on a search radar and on a tracking radar, but its preferred use is in a multifunctional radar in which the auxiliary receiving channel already exist for the monopulse measurement. In this case, the necessary extra hardware is reduced to a minimum.

We claim:

1. A method of operating a radar system with pulse-to-pulse frequency agility, comprising the steps of:
  (a) transmitting to a target for searching or tracking a sequence of pulses and receiving from said target first-time-around, second-time-around and multiple-time-around echoes during each of a multiplicity of sweep;
  (b) changing the frequency of each transmitted pulse from sweep to sweep with pulse-to-pulse frequency agility, whereby the first-time-around echoes each have a frequency corresponding to that of the transmitted pulse of the respective sweep each second-time-around echo has a frequency corresponding to that of the transmitted pulse of an immediately prior sweep, and said multiple-time-around echoes each have a frequency corresponding to that of a transmitted pulse of a still-earlier sweep;
  (c) tuning a plurality of receivers equal in number to the highest order multiple-time-around echo to be detected to respective frequencies equal to the transmitted pulse frequencies resulting in said first-time-around, said second-time-around and each of said multiple-time-around echoes up to said highest order multiple-time-around echo;
  (d) detecting the echoes received from said target and channeling said echoes to said receivers whereby each receiver responds to echoes of a frequency to which that receiver has been tuned in step (c), thereby resolving said echoes and establishing a location of said target in a nonambiguous range of the radar system; and changing the frequencies to which said receivers are tuned in step (c) in accordance with the frequency-agility alteration of the frequencies of said transmitted pulses, said radar system being a monopulse system having a Σ channel and a plurality of channels each having a respective receiver, said method further comprising, in a monopulse mode, transmitting a transmitted pulse through said Σ channel and receiving an addition signal through said Σ channel while receiving difference signals through said Δ channels in said monopulse mode, and switching over from said monopulse mode to pulse-to-pulse frequency agility mode whereupon said receivers are tuned in step (c) to frequencies of said transmitted pulses.

2. A radar system comprising:

oscillator means for generating a series of transmitted pulses of different frequencies with pulse-to-pulse frequency agility;

antenna means connected to said oscillator means for transmitting said transmitted pulses to a target and for receiving from said target on successive sweeps, first-time-around, second-time-around and multiple-time-around echoes during each of said sweeps;

a plurality of receiving channels connectable to said antenna means and each having a receiver tunable to one of the frequencies of the transmitted pulses; and means for tuning said receivers as a function of the sequence of the transmitted pulse frequencies, said radar system being connected to enable monopulse radar operation and wherein one of said receivers in monopulse mode is used for Σ reception and wherein others of said receivers in monopulse mode are used as auxiliary receivers for reception, said radar system further comprising an RF amplifier in said receiving channel of the receiver used for Δ reception, and a divider connected to an output of said RF amplifier for distributing an RF signal therefrom to said receiver used for Σ reception and said receivers used as auxiliary receivers for Δ reception when said radar system is used for pulse-to-pulse frequency agility radar.

3. The radar system defined in claim 2, further comprising a respective switch connected to each of said auxiliary receivers for selectively connecting said RF amplifier in said receiving channel of the receiver used for Σ reception and respective RF amplifiers connected to said antenna means to said auxiliary receivers.

4. The radar system defined in claim 2 wherein said oscillator means comprises:

a source of a number of frequencies equal in number to said channels;

a respective distributor connected to said source for each of the frequencies thereof;

a plurality of switches each connected to all of said distributors and having respective outputs; and respective frequency multipliers connected to said outputs of said switches whereby frequencies can be selected simultaneously and independently from among all of the frequencies available in the radar system.

5. The radar system defined in claim 2 wherein said oscillator means includes:

a source of a number of frequencies equal in number to said channels;

a respective distributor connected to said course for each of the frequencies thereof;

a plurality of distributor switches each connected to all of said distributors and having respective outputs; and a transmitter switch connecting said outputs to said antenna means for selecting proper frequencies for transmission.

6. The radar system defined in claim 2 wherein said oscillator means includes a respective oscillator connected to each of said channels.

7. The radar system defined in claim 2 wherein said oscillator means includes a STALO selection circuit which directly control an oscillator, and a receiving channel selection circuit controlling switches connected to at least said auxiliary receivers and provided with a memory for the frequencies of previously transmitted pulses.

8. The radar system defined in claim 2, further comprising:

a receiving RF amplifier connected to said antenna means; and a divider connected to an output of said RF amplifier and dividing an RF signal received therefrom to said receiving channels.

9. The radar system defined in claim 2, wherein said oscillator means comprises an RF oscillator group from which several different frequencies can be selected simultaneously and independently.

10. The radar system defined in claim 9, further comprising a STALO selection circuit connected to said oscillator group for selection of said different frequencies and including a memory for the frequencies of at least two pulses previously transmitted immediately prior to a current transmitted pulse.

* * * * *